United States Patent [19]

Brettschneider et al.

[11] Patent Number: 5,201,972
[45] Date of Patent: Apr. 13, 1993

[54] PNEUMATIC VEHICLE TIRE HAVING BEADS THAT ARE TURNABLE

[75] Inventors: Wolfgang Brettschneider, Seelze/Velber, Fed. Rep. of Germany; Carsten Boltze, Uniontown, Ohio; Heinrich Huinink, Garbsen, Fed. Rep. of Germany

[73] Assignee: Continental Aktiengesellschaft, Hanover, Fed. Rep. of Germany

[21] Appl. No.: 718,415

[22] Filed: Jun. 21, 1991

Related U.S. Application Data

[63] Continuation-in-part of Ser. No. 366,648, Jun. 14, 1989.

[30] Foreign Application Priority Data

Jun. 14, 1988 [DE] Fed. Rep. of Germany ....... 3820135

[51] Int. Cl.$^5$ .............................................. B60C 15/04
[52] U.S. Cl. ..................................... 152/540; 152/539; 245/1.5
[58] Field of Search ............... 152/539, 540; 156/136; 245/1.5

[56] References Cited

U.S. PATENT DOCUMENTS

| | | | |
|---|---|---|---|
| 4,508,586 | 4/1985 | Brown et al. | 156/401 |
| 4,597,426 | 7/1986 | Mauk et al. | 152/379.5 |
| 4,781,232 | 11/1988 | Klose | 152/540 |
| 4,955,418 | 9/1990 | Baumhöfer | 152/539 |

FOREIGN PATENT DOCUMENTS

| | | | |
|---|---|---|---|
| 0146715 | 7/1985 | European Pat. Off. | 152/540 |
| 0413207 | 2/1991 | European Pat. Off. | 245/1.5 |
| 3406926 | 9/1985 | Fed. Rep. of Germany | 152/540 |
| 2026875 | 1/1988 | Fed. Rep. of Germany | 152/540 |

Primary Examiner—Michael W. Ball
Assistant Examiner—Nancy T. Krawczyk
Attorney, Agent, or Firm—Robert W. Becker & Associates

[57] ABSTRACT

A pneumatic vehicle tire having a carcass that is looped about two bead cores that comprise load-carrying members such as plastic filaments and/or metal wires, with beads in which the bead cores are disposed being capable of turning from a vulcanizing position into an operating position when the tire is being mounted on a wheel rim. In order to improve the tasks of the beads without adversely affecting their ability to turn, the surfaces of the load-carrying members of the bead cores, during turning of the beads prevent adhesion to vulcanized rubber at least to the extent that the load-carrying members are immersed in rubber in the vulcanizing position, so that each load-carrying member is individually rotatable about its longitudinal axis relative to the surrounding rubber of the pertaining bead.

12 Claims, 3 Drawing Sheets

PNEUMATIC VEHICLE TIRE HAVING BEADS THAT ARE TURNABLE

This application is a continuation-in-part of pending application Ser. No. 366,648 filed Jun. 14, 1989.

BACKGROUND OF THE INVENTION

The present invention relates to a pneumatic vehicle tire having a carcass that is looped about two bead cores that comprise load-carrying members such as plastic filaments and/or metal wires, with the beads in which the bead cores are disposed being capable of turning from a vulcanizing position into an operating position when the tire is being mounted on a wheel rim.

A pneumatic vehicle tire of this general type is disclosed in U.S. Pat. No. 4,597,426, Gerhard Mauk et al, issued Jul. 1, 1986 and belonging to the assignee of the present application. This patent indicates that the bead can be rotated about a certain angle that depends upon the properties of the material and the construction of the bead core and the remainder of the bead. Finally, to facilitate the rotational movement of the bead about the bead core, this patent proposes that the bead core be embedded in the bead in a nonadhesive manner, for example by being wound with an appropriately treated strip of fabric.

The aforementioned measures do in fact reduce the resistance of the beads toward turning to such an extent that a mounting process is possible that does not require large recessed mounting portions. Unfortunately, the fatigue strength of these beads, and the true running of the tires provided therewith, leaves much to be desired.

German Offenlegungsschrift 3440440 discloses a bead core with a central member and a plurality of outer members situated therearound. However, the wires of at least the outer layer of members are firmly bonded together, thereby not allowing rotation of each individual member relative to the surrounding bead rubber. Such a construction places too much stress on the bead core.

German Offenlegungsschrift 2026875 discloses a bead core comprised of several strands. Unfortunately, the outer layer of strands is provided with a coating of copper, which enhances bonding between these strands and the surrounding rubber. Thus, this construction resists rather than facilitates the ability of the beads to turn when the tire is being mounted on a wheel rim.

It is an object of the present invention to overcome the problems caused by insufficient fatigue strength of the bonding of the outer wires of the beads while at the same time enhancing the ability of the beads to turn.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
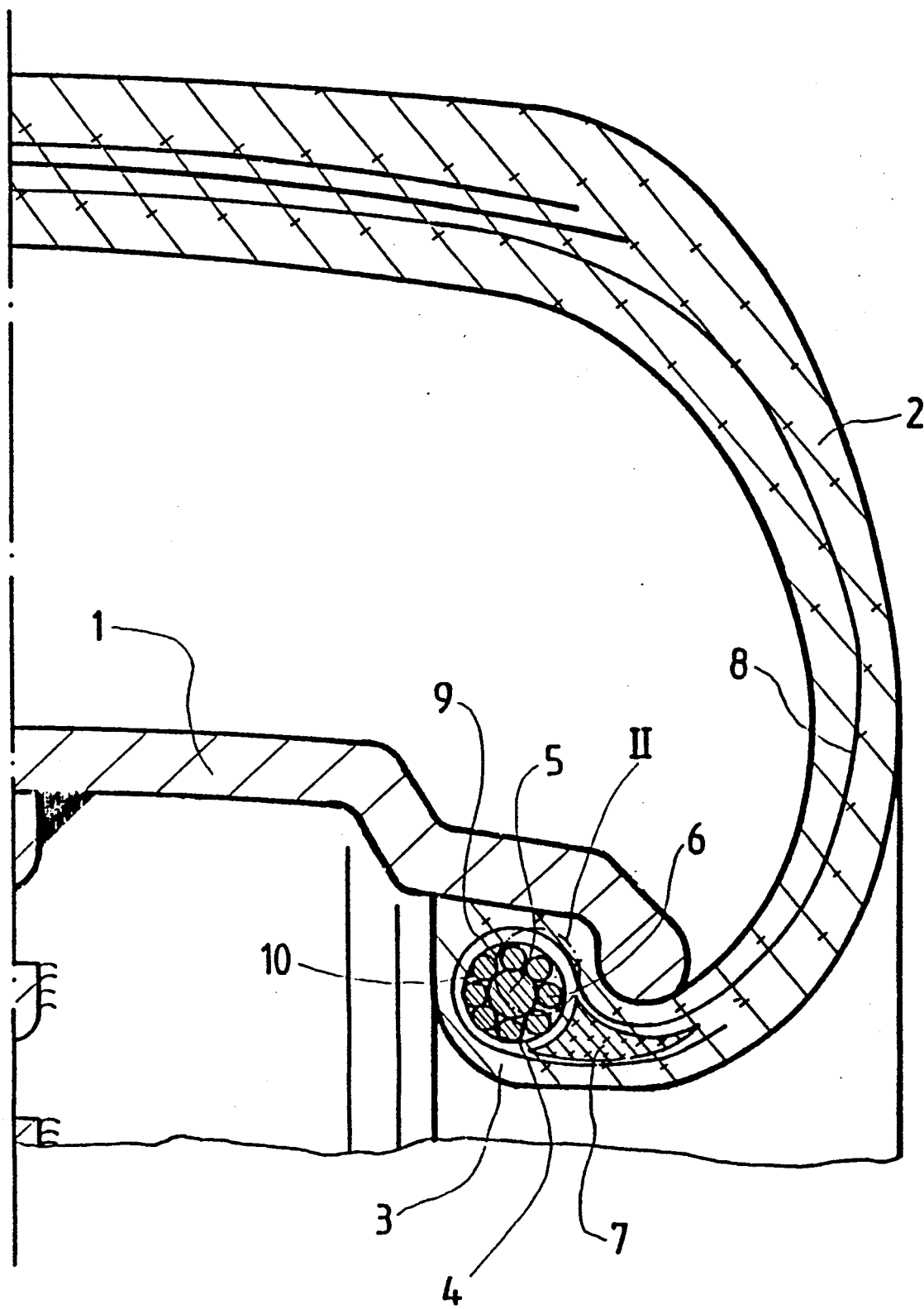
FIG. 1 is a partial cross-sectional view showing a vehicle wheel on which is mounted one exemplary embodiment of the inventive pneumatic tire.

The pneumatic vehicle tire of the present invention is characterized primarily in that the surfaces of the load-carrying members of the bead cores, during turning of the beads, prevent adhesion to vulcanized rubber, at least to the extent that the load-carrying members are immersed in rubber in the vulcanizing position, so that each load-carrying member is individually rotatable about its longitudinal axis relative to the surrounding rubber of the pertaining bead. This could also be stated differently, depending upon whether one views the bead rubber as "standing still" and the load-carrying members as moving or rotating relative thereto, or the load-carrying members as "standing still" and the bead rubber as moving or rotating relative thereto. Thus, the inventive tire could be characterized by the adhesion-preventing such that the surrounding rubber of the beads is rotatable relative to each individual load-carrying member thereof.

Two realizations that were discovered in complicated tests underlie the present invention. On the one hand, the hoped-for rotatability or twisting of the bead cores, i.e. a twisting or distortion of the bead core cross-section, as mentioned in the state of the art proved to be misleading or even illusory; due to the tacky rubber that penetrated between the wires of the core, these cores were quasi rigid, especially against rotation. On the other hand, a relative movement of the bead, especially of the carcass envelope, about the quasi rigid bead core, proved to be very detrimental; this can be explained by the fact that the position of the bead core relative to the remainder of the bead is not defined very precisely, and a concentration of the relative movement upon small surfaces leads to damages to these surfaces.

The critical inventive concept is that contrary to previous teachings, rotatability of the entire bead core, as a unit, relative to the remainder of the bead does not solve this problem; rather, what is needed, in contrast to the solution proposed in the aforementioned U.S. Pat. No. 4,597,426, Gerhard Mauk et al, is the displacement of the gliding surface from the periphery of the bead cores to the periphery of each individual load-carrying member, resulting in a rotatability of each individual load-carrying member about its longitudinal axis relative to the surrounding rubber. The individual rotatability of each load-carrying member relative to the surrounding rubber is achieved by using load-carrying members whose surfaces, during turning of the beads, permit no adhesion to the surrounding rubber. The otherwise usual adhesion is prevented, for example, by the selection of such a chemical material for the load-carrying members that cannot react in a bonding manner with rubber, or by providing the surfaces of the load-carrying members of the bead cores with an adhesion-inhibiting coating.

When the beads are turned, the outer load-carrying members move about the core or center like the cars of a ferris wheel move about its axis. The important thing is that the load-carrying members carry out their movement about an approximately circular path about the center core in a purely translatory manner, i.e. without rotation about their own axes relative to a frame of reference outside the tire. Thus, when viewed in cross-section, the load-carrying members do not rotate relative to one another when the beads are turned, but rather rotate relative to the surrounding bead rubber.

As a result, all concentrations of stress and friction are avoided.

Pursuant to a further development of the present invention, at least some of the load-carrying members of the bead cores are embedded in a rubber layer in such a way that they are at least partially contacted by this rubber layer. In other words, the pertaining load-carrying members are at least partially surrounded by rubber without any clearances. Due to a greater osculation, this leads to particularly large effective surfaces for the transmission of force between the carcass and the bead core. It is expedient to use polymers that during cooling off from the vulcanization temperature contract more than does the material of the load-carrying members. This is important because the best transfer of force is achieved where a slight press fit exists.

Despite the slight press fit, to assure an easy rotatability it is desirable for the adhesion-inhibiting coating to contain lubricant. For tires where the bead cores are built up from steel wires, the best results have been achieved if the adhesion-inhibiting coating contains at least one metallic stearate, especially calcium and/or sodium and/or zinc stearate.

The customary copper or brass plating of the steel wires is expediently dispensed with for the inventive bead cores, because it is the essence of the present invention that each individual load-carrying member not adhere to the surrounding rubber. However, brass and copper enhance adhesion. Since a coating of the bead wires with a noble-like metal is dispensed with, it is recommended that the adhesion-inhibiting coating also contain water-repellent substances, such as mineral oils, and that this coating be applied immediately, so that nowhere is wire handled that is not protected from corrosion. A further improvement is possible by plating the wires with chrome or zinc.

In addition to increasing the fatigue strength and facilitating the ability of the beads to turn the present invention also enables an increased true running. For this purpose, the rubber layer in which the load-carrying members are embedded expediently has a Shore hardness of between 85 and 92.

Further specific features of the present invention will be described in detail subsequently.

DESCRIPTION OF PREFERRED EMBODIMENTS

Referring now to the drawings in detail, the cross-sectional view of FIG. 1 shows the upper portion of the right half of a vehicle wheel and tire assembly that includes a wheel rim 1 and a pneumatic tire 2. The beads 3 of the tire 2 are seated on the radially inwardly directed side of the rim 1. Disposed in the beads 3 are bead cores 4 that in this embodiment comprise a center wire 5 and eight lay wires 6 that are helically wound about the wire 5. Adjacent each bead core 4 is a profiled filler member 7. The single-ply radial carcass 8 is looped about the bead cores 4 and the filler members 7. The surfaces 10 on the wires 5, 6 are coated with an adhesion inhibitor and, after the twisting or laying process, i.e. the aforementioned process of helically winding the lay wires 6 about the center wire 5, are impregnated with a rubber solution that after vulcanization results in the hard bedding or support rubber 9. The wires 5, 6 of the bead cores 4 are fixed in position relative to the beads 3 in such a way that they are free from play, similar to the roller bodies in a roller bearing cage; however, as a freedom of movement, it is possible for the wires 5, 6 to rotate about their own axes as a consequence of the nonadhesive steel wire surface. In particular, the term "free from play" refers to the outer wire 6 being fixed in position relative to each other and relative to the beads 3, thereby preventing wires from laterally moving relative to each other and the bead rubber. However, "free from play" does not mean that the wires cannot rotate along their respective axes relative to the bead rubber. Since the wires 6 are non-adhering to the bead rubber, pursuant to the present invention they are free to rotate about their own axes while maintaining their relative positions with respect to the bead rubber and to each other.

Figure 2:
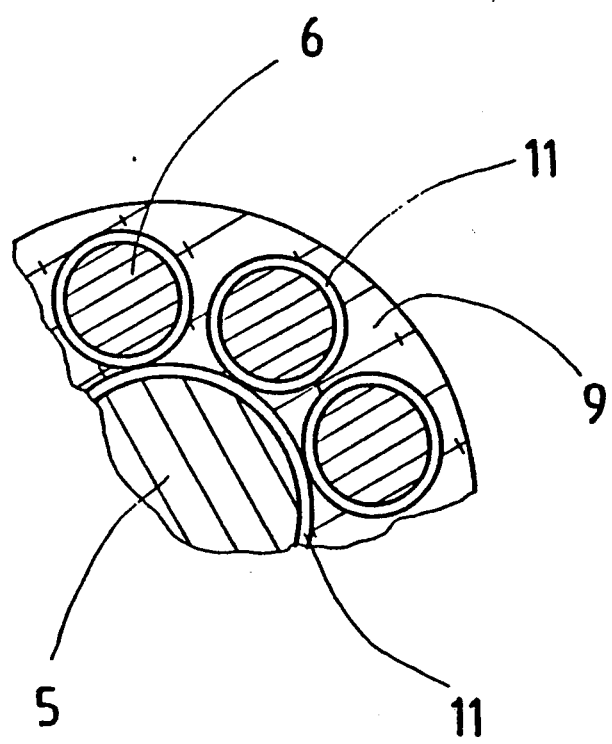
FIG. 2 is an enlarged partial cross-sectional view through a bead core, in particular showing the dot-dash encircled portion II of FIG. 1.

FIG. 2 is an enlarged detailed view of a portion of the cross-section of a bead core 4. Clearly illustrated is the adhesion-inhibiting coating or layer 11 on the load-carrying members 5, 6. As a consequence, there is no adhesion between the support rubber 9 and the wires 5, 6.

Figure 3:
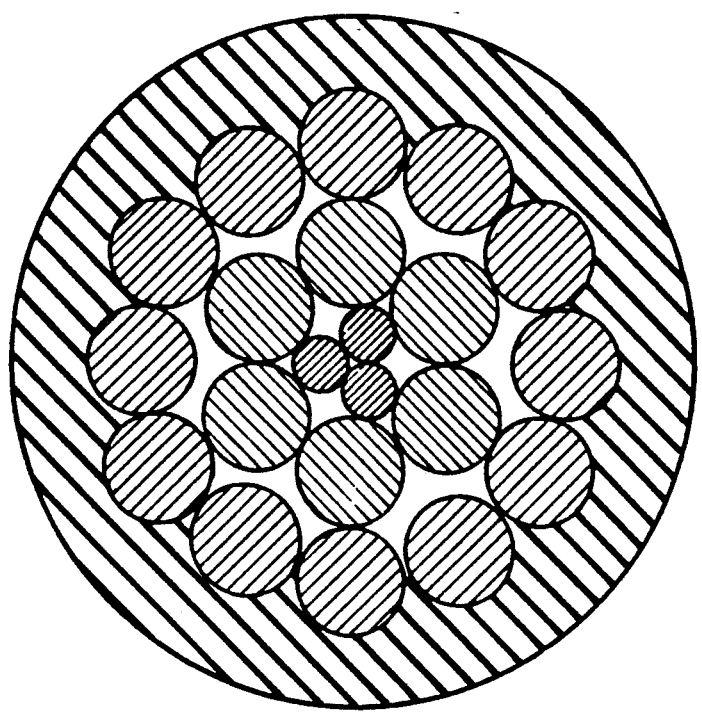
FIG. 3 is an enlarged cross-sectional view through a modified bead core of the inventive tire.

FIG. 3 is an enlarged detailed view of the cross-section of a modified bead core 4. In particular, in this embodiment a central portion 5' is provided; this central portion has a multi-wire cross-sectional configuration, which can be provided either by separate wires or by a single wire that is twisted about itself and completes several complete turns as viewed in the circumferential direction. As a further variation, in this embodiment, rather than only a single layer of several wires being disposed about the central portion, two layers, each of which comprises a plurality of wires, are disposed about the central portion. Variations of the embodiments illustrated in FIGS. 2 and 3 would, of course, also be possible. For example, the central portion 5' of FIG. 3 could consist of a single-wire cross-sectional configuration, while the center wire 5 of FIG. 2 could have a multi-wire cross-sectional configuration.

The translatory fixation of the wires prevents sharp bending and fanning-out of the bead cores 4 during pressure loading; nevertheless, the one rotational degree of freedom of the wires 5, 6 enables the beads 3 to turn. The term "translatory fixation" refers to the wires 6 being fixed relative to each other in the bead rubber or support rubber 9.

The present invention is, of course, in no way restricted to the specific disclosure of the specification and drawings, but also encompasses any modifications within the scope of the appended claims.

What we claim:

1. A pneumatic vehicle tire, comprising:
    a carcass that is looped about two bead cores that are disposed in respective beads of said tire and with each bead core comprising at least outer load-carrying members, with said bead being capable of turning from a vulcanizing position into an operating position when said tire is being mounted on a wheel rim, and with said load-carrying members of said bead cores having surfaces that during said turning prevent adhesion to vulcanized rubber, at least to the extent that said load-carrying members are immersed in rubber in said vulcanizing position, so that each of said load-carrying members is individually rotatable about its longitudinal axis relative to the surrounding rubber of the pertaining bead, such that, relative to an external frame of reference, during said turning, said at least outer load carrying members are displaced in a circular path without rotation about said individual axis, thereby facilitating said ability of said beads to turn when said tire is being mounted on said rim.

2. A pneumatic vehicle tire according to claim 1, wherein said surfaces of said load-carrying members of said bead cores are provided with an adhesion-inhibiting coating to effect said prevention of adhesion to vulcanized rubber.

3. A pneumatic vehicle tire according to claim 2, wherein said adhesion-inhibiting coating includes lubricant.

4. A pneumatic vehicle tire according to claim 3, wherein said load-carrying members comprise steel wires, and said adhesion-inhibiting coating contains at least one metallic stearate.

5. A pneumatic vehicle tire according to claim 4, wherein said at least one metallic stearate is selected from the group consisting of calcium stearate, sodium stearate, and zinc stearate.

6. A pneumatic vehicle tire according to claim 1, wherein said load-carrying members of each of said bead cores comprises a central core portion and a plurality of said outer members that are disposed around said central core portion in at least one layer.

7. A pneumatic vehicle tire according to claim 6, wherein both said central core portion and said outer members are freely rotatable about their respective axes relative to one another as well as to said beads.

8. A pneumatic vehicle tire according to claim 7, wherein each of said outer members bears against said central core portion.

9. A pneumatic vehicle tire according to claim 6, wherein said central core portion has a single-wire cross-sectional configuration.

10. A pneumatic vehicle tire according to claim 6, wherein said central core portion has a multi-wire cross-sectional configuration.

11. A pneumatic vehicle tire according to claim 6, wherein said outer members of said bead cores are at least partially embedded in a rubber layer.

12. A pneumatic vehicle tire according to claim 11, wherein said rubber layer has a Shore hardness of from 85 to 92.

* * * * *